(12) United States Patent
Kirchhoffer

(10) Patent No.: US 11,884,221 B2
(45) Date of Patent: Jan. 30, 2024

(54) ON-BOARD ELECTRICAL NETWORK OF A MOTOR VEHICLE

(71) Applicant: FORD GLOBAL TECHNOLOGIES, LLC, Dearborn, MI (US)

(72) Inventor: Johann Kirchhoffer, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 807 days.

(21) Appl. No.: 17/020,929

(22) Filed: Sep. 15, 2020

(65) Prior Publication Data

US 2021/0078516 A1 Mar. 18, 2021

(30) Foreign Application Priority Data

Sep. 18, 2019 (DE) .......................... 102019125068.4

(51) Int. Cl.
*B60R 16/033* (2006.01)
*H02J 7/00* (2006.01)
*H02J 7/14* (2006.01)

(52) U.S. Cl.
CPC .......... *B60R 16/033* (2013.01); *H02J 7/0029* (2013.01); *H02J 7/1446* (2013.01); *H02J 2310/40* (2020.01)

(58) Field of Classification Search
CPC ..... B60R 16/033; H02J 7/0029; H02J 7/1446; H02J 2310/40
See application file for complete search history.

(56) References Cited

U.S. PATENT DOCUMENTS

| 8,219,289 | B2 | 7/2012 | Kamada et al. |
| 2017/0015262 | A1 | 1/2017 | Kikuchi |
| 2018/0290608 | A1 | 10/2018 | Hida |
| 2020/0086762 | A1* | 3/2020 | Kirchhoffer .......... B60L 3/0023 |
| 2021/0078443 | A1* | 3/2021 | Kirchhoffer ............ B60R 16/03 |
| 2021/0078516 | A1* | 3/2021 | Kirchhoffer .......... B60R 16/033 |

FOREIGN PATENT DOCUMENTS

| CN | 108177649 | A | * | 6/2018 | |
| CN | 109212977 | B | * | 2/2021 | ........... G05B 13/042 |
| CN | 113276658 | A | * | 8/2021 | |
| CN | 115489357 | A | * | 12/2022 | .............. B60L 53/16 |

(Continued)

*Primary Examiner* — Adam D Houston
(74) *Attorney, Agent, or Firm* — Frank L. Lollo; MacMillan, Sobanski & Todd, LLC

(57) ABSTRACT

An on-board electrical network (4) of a motor vehicle (2) has a first voltage circuit (I) and a second voltage circuit (II), wherein the first voltage circuit has a first operating voltage higher than a second operating voltage in the second voltage circuit. The first voltage circuit is connected to the second voltage circuit via a DC voltage converter (8). The first voltage circuit has a battery (10) and the second voltage circuit has a main battery (12) and an auxiliary voltage source (14). By means of a first switching element (16) and a second switching element (18) at least one of transmission control unit (20) and/or integrated hybrid controller (22) are supplied with electrical energy from the main battery (12) and/or the auxiliary voltage source (14). Control unit (20) and/or hybrid controller (22) can be selectably disconnected from either the main battery (12) and/or the auxiliary voltage source (14).

16 Claims, 4 Drawing Sheets

(56) References Cited

FOREIGN PATENT DOCUMENTS

| | | | | |
|---|---|---|---|---|
| DE | 102016220557 A1 | * | 4/2018 | ............ B60L 3/0046 |
| DE | 102018215605 A1 | * | 3/2020 | ................ B60L 1/00 |
| DE | 102020102591 A1 | * | 8/2021 | ................ B60L 1/00 |
| DE | 102021109442 A1 | * | 10/2022 | |
| DE | 102011109709 B4 | * | 12/2022 | .............. B60L 50/16 |
| DE | 102021124184 A1 | * | 3/2023 | |
| EP | 3907110 A1 | * | 11/2021 | ............. B60R 16/03 |
| JP | 4913567 B2 | | 4/2012 | |
| JP | 2018061304 A | | 4/2018 | |
| JP | 2018062253 A | | 4/2018 | |
| JP | 2018105420 A | | 7/2018 | |
| KR | 20180087117 A | * | 8/2018 | |
| KR | 20220053738 A | * | 5/2022 | |

* cited by examiner

ON-BOARD ELECTRICAL NETWORK OF A MOTOR VEHICLE

CROSS REFERENCE TO RELATED APPLICATIONS

This application claims priority to application DE102019125068.4, filed in the German Patent and Trademark Office on Sep. 18, 2019, which is incorporated herein by reference in its entirety.

STATEMENT REGARDING FEDERALLY SPONSORED RESEARCH

Not Applicable.

BACKGROUND OF THE INVENTION

The invention relates to a method for operating an on-board electrical network of a motor vehicle. The invention also relates to a computer program product, an on-board electrical network for a motor vehicle, and a motor vehicle having such an on-board electrical network.

An on-board electrical network is understood to mean the totality of all electrical components in a motor vehicle, such as a car.

The commonly used 12-Volt on-board electrical network can now barely meet the power supply requirements of a modern motor vehicle for its comfort systems. The "static" electrical loads almost completely consume the power-generating capability of the alternator, which delivers up to 3 kW of power, especially at low temperatures. For additional dynamic electrical loads, such as powerful electrically driven compressors, the 12-Volt battery/alternator power supply is not sufficient. Therefore, a second partial on-board electrical network with a voltage of 48 Volts may be added, which complements the 12-Volt onboard network.

An on-board electrical network with an operating voltage of 48 Volts also offers the possibility of implementing a hybridization operation (i.e., combined electrical motor and combustion engine propulsion) more simply, quickly, and cost-effectively while keeping harmful emissions below statutory limits as a result of partial electrification of the powertrain of the motor vehicle.

The use of a 48-Volt on-board electrical network does not replace the previously known 12V on-board network, but supplements it. Many established components in the motor vehicle can continue to be operated exclusively with a voltage of 12 Volts. Thus, a complete and therefore expensive conversion to higher electrical voltages can be avoided.

In operation a unidirectional or bidirectional DC voltage converter can supply the 12-Volt on-board network from the 48-Volt onboard network.

In the case of a motor vehicle in the form of a mild hybrid, the powertrain has an electric motor, such as a belt-driven starter generator (BiSG) or a transmission-integrated motor generator (TiMG), an inverter, a DC voltage converter and a 48-Volt battery. Hence a 48-Volt on-board electrical network can be used to operate an electric motor as a propulsion motor with up to 15 kW. However, this requires an engine restart under all driving conditions, even at low speeds.

In view of the engine start requirement and the need to decouple the main battery, a second battery at 12 V is required in combination with a 12 V output of the DC/DC converter in order to stabilize the on-board supply voltage in particular when starting up the internal combustion engine. However, fluctuations in the operating temperature may cause a 12-Volt output of the DC/DC converter to be unstable.

The 48-Volt battery may often be a lithium-ion battery. Such lithium-ion batteries, however, do not deliver enough electrical current at low temperatures to start the engine. Therefore, a conventional starter is supplied with operating power from a 12-Volt lead-acid battery.

Special requirements on operational safety are placed by Shift-by-Wire systems or Park-by-Wire systems, in which actuating signals are only transmitted electrically. Some system redundancy is therefore required, so that for example a motor vehicle can be safely parked with a parking system or an electric parking brake in the event of a particular fault.

In patent publications JP 4913567 B2, US 2017/0015262 A1, JP 2018-061304A, U.S. Pat. No. 8,219,289 B2, JP 2018-062253A, DE 102017223588 A1, and US 2018/0290608 A1, on-board networks are disclosed which have a 48-volt lithium battery and a 12-volt lead battery. The present invention provides increased operating safety of such an on-board electrical networks.

SUMMARY OF THE INVENTION

In some embodiments of the invention, an on-board electrical network is operated in a motor vehicle, having a first voltage circuit and a second voltage circuit. The first voltage circuit has a first operating voltage which is higher than a second operating voltage in the second voltage circuit. The first voltage circuit is connected to the second voltage circuit via a DC voltage converter, wherein the first voltage circuit has a battery and the second voltage circuit has a main battery and an auxiliary voltage source (e.g., an auxiliary battery or other source), and wherein by means of a first switching element and a second switching element at least one transmission control unit and/or an integrated hybrid controller are supplied with electrical energy from the main battery and/or the auxiliary voltage source, and in the event of a fault at least the transmission control unit and/or the integrated hybrid controller and/or the ABS/EPB system are disconnected from the main battery and/or the auxiliary voltage source.

Redundancy of the operating energy supply in the second voltage circuit is achieved by the main battery and the auxiliary battery, in order to ensure the maximum possible safety in shift-by-wire or park-by-wire systems, combined with the ABS/EPB system of the motor vehicle. In the event of a single power failure, the vehicle can therefore be safely parked with a parking system (operated by the TCM) and/or an electric parking brake (EPB).

According to one embodiment, the auxiliary voltage source is an auxiliary battery. In other words, the auxiliary battery has a capacity that is smaller than the capacity of the main battery. For example, the capacity of the auxiliary battery can be ⅕ to 1/10 of the capacity of the main battery. This limits the increase in the total weight of the motor vehicle.

According to a further embodiment the auxiliary voltage source is formed by an electrically conductive connection to the DC voltage converter. This means that the DC voltage converter can be used to replace the main battery in the event of its failure. No additional batteries are therefore needed.

According to another embodiment, the auxiliary voltage source is a supercapacitor. Supercapacitors (also ultracapacitors) have only about 10% of the energy density compared to accumulators of the same weight, but their power density is roughly 10 to 100 times as great. Supercapacitors can therefore be charged and discharged very quickly. Unlike ceramic, foil, and electrolytic capacitors, supercapacitors do not have a dielectric in the conventional sense. The capacitance values of the supercapacitors are derived from the sum of two storage principles, namely the static storage of electrical energy by charge separation in Helmholtz double layers and by electrochemical storage of electrical energy by Faraday charge exchange using redox reactions in a pseudo capacitance. In this way, also, the increase in the total weight of the motor vehicle can be limited.

According to some embodiments, the first switching element is opened upon detection of a starting mode and/or upon detection of a fault in the on-board network so that the transmission control unit and/or the integrated hybrid controller is supplied from the auxiliary voltage source. In other words, the first switching element is in a normally closed state. When the internal combustion engine is to be started, non-essential loads on the on-board network are disconnected by opening the first switching element, so that the full power of the main battery is available for starting. If a fault has been detected in the transmission control unit and/or in the integrated hybrid controller, the first switching element is likewise opened to disconnect these components from the on-board network. This can further increase the operational safety.

According to another embodiment, the second switching element is closed to start a charging process for the auxiliary voltage source and the second switching element is opened to end a charging process and/or to disconnect the auxiliary voltage source from the on-board power supply in the event of a fault. In other words, by closing the second switching element, an auxiliary battery and/or a supercapacitor can be charged, which then acts as an auxiliary voltage source. To stop charging and prevent unnecessary discharging, the second switching element can then be opened. This can also further increase the operational safety.

An important point is that the two switching elements are closed in their normal state, so that both voltage sources are simultaneously available to the shift-by-wire or park-by-wire systems and/or combined with the ABS/EPB system and can then switch off the non-functioning voltage source in the event of a fault, wherein the functional voltage source remains available. This prevents a loss of voltage to the above systems in the event of a fault.

The invention also relates to a computer program product, an on-board electrical network for a motor vehicle, and a motor vehicle having such an on-board network.

DETAILED DESCRIPTION OF PREFERRED EMBODIMENTS

Figure 1:
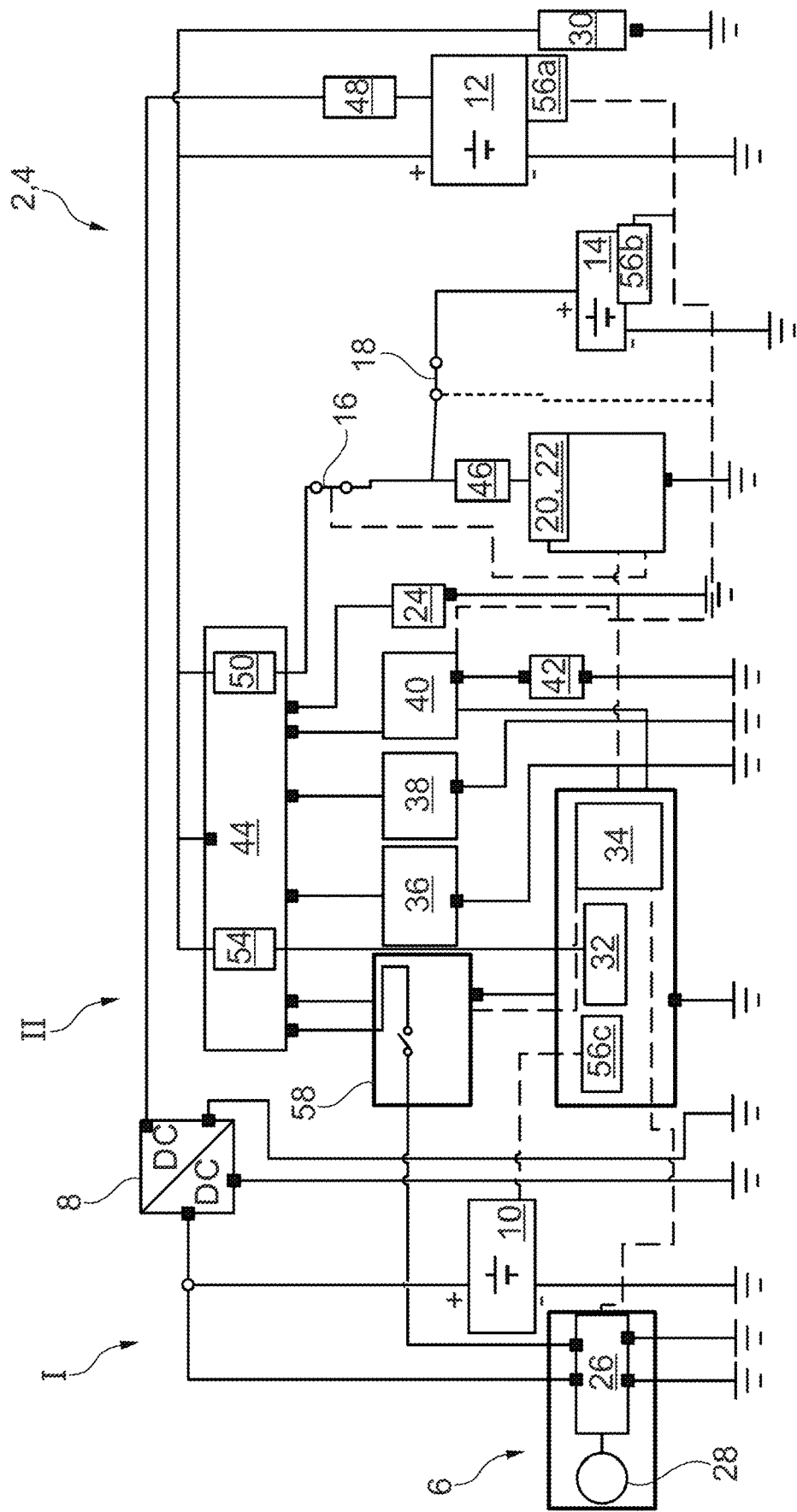
FIG. 1 shows a schematic representation of an on-board electrical network of a motor vehicle according to a first exemplary embodiment.

Reference will first be made to FIG. 1 to explain a first exemplary embodiment. FIG. 1 shows an on-board electrical network 4 of a motor vehicle 2, such as a car.

The motor vehicle 2 in the present exemplary embodiment has a powertrain 6. This powertrain 6 comprises all the components of the motor vehicle 2 that generate the power to drive the motor vehicle 2 and transfer it onto the road.

In the present exemplary embodiment the powertrain 6 is designed as a mild hybrid powertrain. In other words, the motor vehicle 2 has a hybrid drive and is implemented as a hybrid electric vehicle. A hybrid drive is understood to mean a combination of an internal combustion engine (not shown) and an electric motor 28 for the motor vehicle drive.

The internal combustion engine in the present exemplary embodiment is a petrol engine. In normal operation the petrol engine is operated with an oxygen excess ($\lambda > 1$). By way of deviation from this, the internal combustion engine can also be designed as a Diesel engine in lean-burn mode to increase the engine efficiency.

The electric motor 28 is an electrical rotary motor with a rotor and a stator, which can be operated both as a motor, i.e. as a partial traction motor, and as a generator for energy recovery (e.g., regenerative braking). The electric motor 28 can be designed, for example, as a DC motor, an AC motor, a synchronous motor, an asynchronous motor, a brushless electric motor or as a combination of these motor types.

The electric motor 28 of the powertrain 6 implemented as a mild hybrid powertrain delivers up to 15 kW per tonne of vehicle weight. In operation, the electric motor 28 only assists the internal combustion engine to increase power. A purely electric driving is only possible to a limited extent, if at all.

The internal combustion engine and the electric motor 28 can work together in different ways: in parallel (the internal combustion engine and the electric motor 28 act on the moving part at the same time), serially (only one of the motors acts directly on the moving part, while the other motor provides power which is converted and fed to the directly acting motor), or as a power-split hybrid.

The powertrain 6 implemented as a mild hybrid powertrain in the present exemplary embodiment is implemented as a parallel hybrid powertrain.

The on-board electrical network 4 has a first voltage circuit I and a second voltage circuit II. In operation, the first voltage circuit operates at a first operating voltage which is higher than a second operating voltage in the second voltage circuit II. In the present exemplary embodiment, the first operating voltage is 48 volts and the second operating voltage is 12 volts.

The first voltage circuit I is connected to the second voltage circuit II via a DC-to-DC voltage converter 8. The DC voltage converter 8 in the present exemplary embodiment is designed for bidirectional voltage conversion, so for both stepping up and stepping down an electrical voltage between first voltage circuit I and second voltage circuit II.

The first voltage circuit I in the present exemplary embodiment comprises a high-voltage (e.g., 48-Volt) battery 10 and an inverter 26.

The battery 10 in this exemplary embodiment is a lithium-ion battery which is electrically conductively connected to the DC-to-DC converter 8.

The inverter 26 is a bi-directional inverter. In the generator mode of the electric motor 28 the inverter 26 converts an electrical AC voltage into an electrical DC voltage, and vice versa in the case of an application as an electric motor, converting an electrical DC voltage into an electrical alternating voltage. For this purpose the inverter 26 is electrically conductively connected on the input side to the electric motor 28. The inverter 26 is additionally electrically conductively connected on the output side to the DC voltage converter 8.

The second voltage circuit II in the present exemplary embodiment comprises as essential components a main battery 12 and an auxiliary voltage source 14, which in the present exemplary embodiment is an auxiliary battery, the capacity of the auxiliary battery being 1/5 to 1/10 of the capacity of the main battery 12. The second voltage circuit II in the present exemplary embodiment comprises a first switching element 16 and a second switching element 18, a transmission control unit (TCM) 20, an integrated hybrid controller (HFM) 22, e.g. integrated in a transmission control unit, and a gear-selection control unit (GSM) 24 for gear selection between Drive/Neutral/Reverse and Park, which allows the electrically actuated parking lock/immobilizer in the transmission to be engaged and thereby secure the vehicle, and a starter 30. The starter 30 in this exemplary embodiment is a conventional 12V starter.

The gear-selection control unit 24 is actuated by the driver who thus expresses a desire to engage Drive/Neutral/Reverse or Park. The gear-selection control unit 24 then sends an equivalent signal to the transmission control unit 20, which executes this command.

Other components are an ABS/EPB system 32, a powertrain control unit (PCM) 34, an EPAS system 36, a gateway module (GWM) 38, an on-board network control unit (BCM) 40, an infotainment system (IPC) 42, a fuse assembly 44, a first fuse 46, a second fuse 48, a third fuse 50, an EPB/ABS fuse 54, a first battery management system 56a assigned to the first main battery 12 and a second battery management system 56b assigned to the auxiliary battery 14, as well as a third battery management system 56c assigned to the high-voltage battery 10 and a power distribution unit 58.

The components listed may have hardware and/or software components for their tasks and functions described below.

In the normal state, both the first switching element 16 and the second switching element 18 are closed.

Thus, the first switching element 16 forms an electrically conductive connection from the main battery 12 via the fuse 50 and the fuse 46 to the transmission control unit 20 and/or the integrated hybrid controller 22, while the second switching element 18 forms an electrically conductive connection from the auxiliary voltage source 14, in this exemplary embodiment the auxiliary battery, and via the fuse 46 to the transmission control unit 20 and/or the integrated hybrid controller 22.

If a starting mode is detected and/or a fault occurs in the transmission control unit 20 and/or in the integrated hybrid controller 22, the first switching element 16 is opened and the transmission control unit 20 and/or the integrated hybrid controller 22 is disconnected from the main battery 12.

When the second switching element 18 is closed, a charging process for charging the auxiliary battery 14 from the main low-voltage supply (e.g., DC voltage converter 8 and main battery 12) occurs, which can be stopped by opening the second switching element 18. In addition and alternatively, the auxiliary voltage source 14 can thus be disconnected from the on-board network 4 in order to conserve the charged energy in the event of a fault.

In this exemplary embodiment, the first switching element 16 is controlled by the transmission control unit 20 and/or the integrated hybrid controller 22 in the event of a fault in the on-board network 4 and the second switching element 18 is activated by the on-board network control unit 40 in the event of a fault and/or during charging of the auxiliary battery.

A fault in the voltage sources can be detected and communicated, for example, via the battery management systems 56a and 56b via the on-board network control unit 40, in order then to open and close the switching elements 16 and 18 accordingly and to ensure the correspondingly safe operating state with a constant voltage supply. If a fault is present in the auxiliary voltage source (e.g., battery) 14, the switching element 18 is opened and the transmission controller 22 is supplied by the main battery 12 via the closed switching element 16. In an equivalent manner, if a fault is detected in the main battery 12, the switching element 16 is opened and the transmission controller 22 is supplied by the auxiliary voltage source 14 via the closed switching element 18. In the event of a fault, therefore, it is always ensured that the transmission controller 22 does not suffer a voltage drop and can therefore engage the Park position safely in order to secure the vehicle. In this case, the switching element 16 can be operated by the on-board network control unit 40 or optionally by the transmission control unit 22, as shown in FIG. 1.

The control signals for this can be transmitted, for example, via a CAN bus of the motor vehicle 2.

Figure 2:
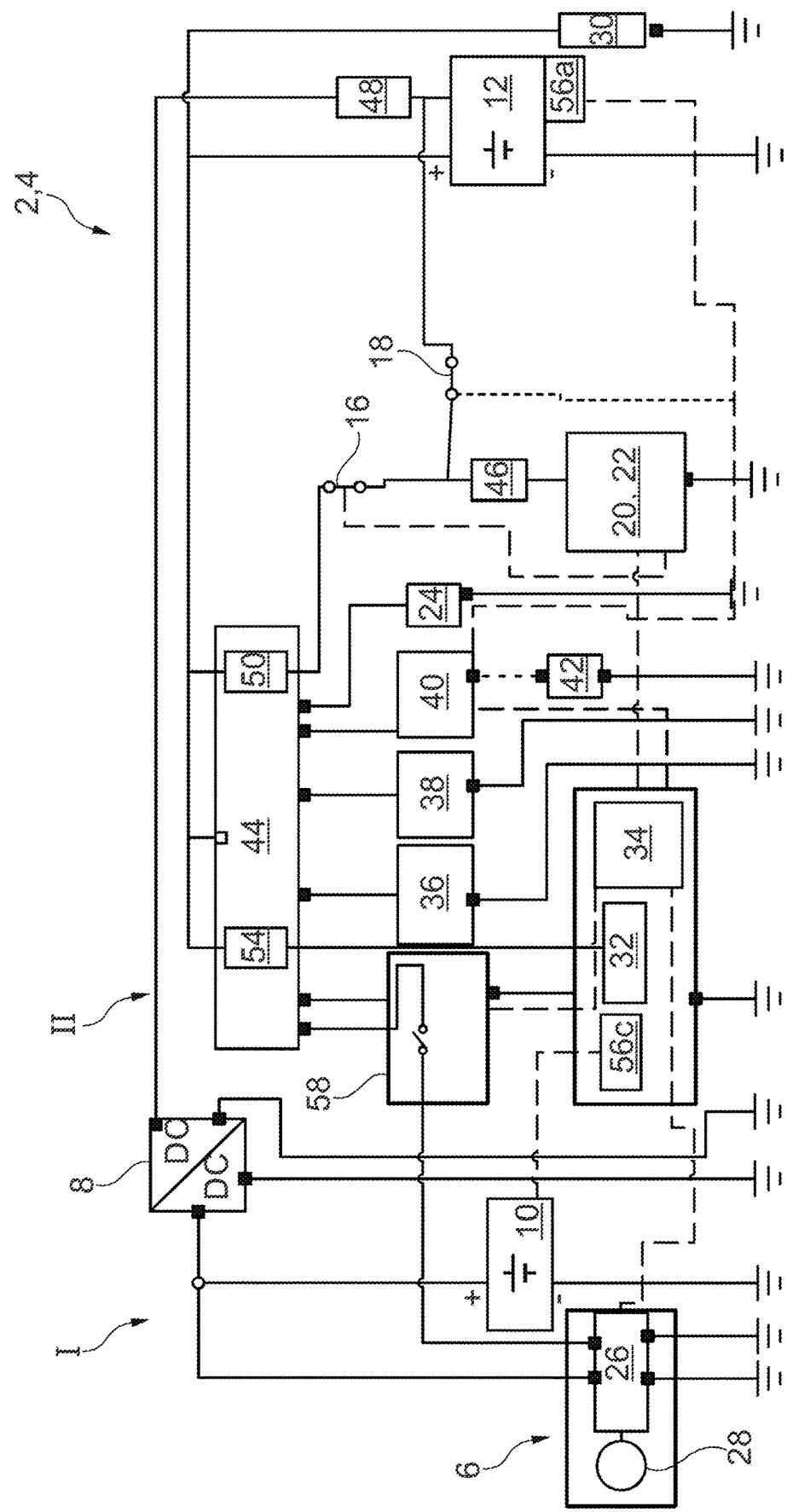
FIG. 2 shows a schematic representation of an on-board electrical network of a motor vehicle according to a second exemplary embodiment.

Reference will now additionally be made to FIG. 2 to explain a second exemplary embodiment.

The on-board network 4 according to the second exemplary embodiment differs from the on-board network 4 according to the first exemplary embodiment in that the auxiliary voltage source 14 is comprised of an electrically conductive connection directly to the DC voltage converter 8. As a result, the second battery management system 56b associated with the auxiliary battery is also absent. Otherwise, the comments made above with regard to the structure and function of the on-board network 4 also apply analogously to the on-board network 4 according to the second exemplary embodiment.

Figure 3:
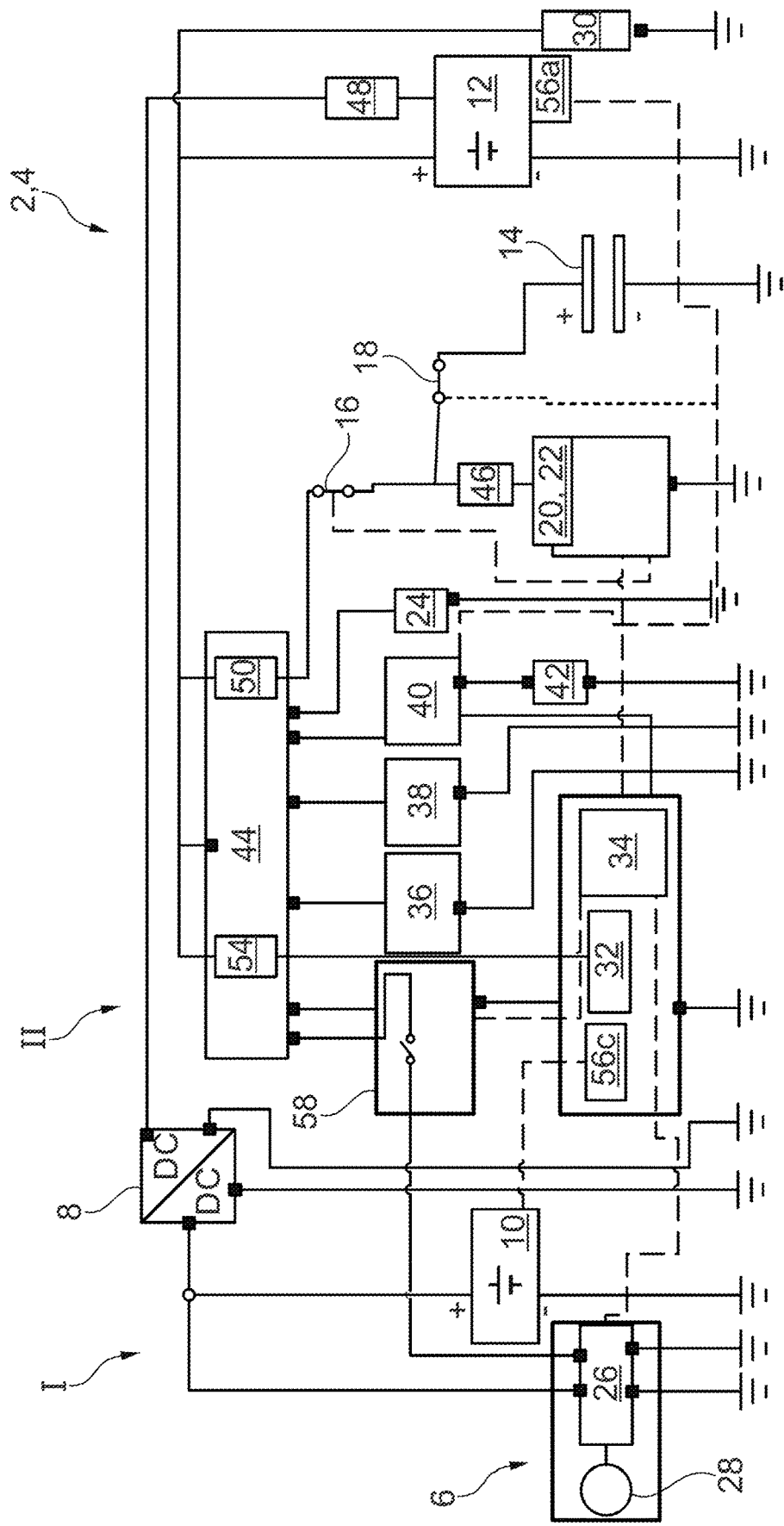
FIG. 3 shows a schematic representation of an on-board electrical network of a motor vehicle according to a third exemplary embodiment.

Reference will now additionally be made to FIG. 3 to explain a third exemplary embodiment.

The on-board network 4 according to the third exemplary embodiment differs from the on-board network 4 according to the second exemplary embodiment in that the auxiliary voltage source 14 is comprised of a supercapacitor. As a result, the second battery management system 56b associated with the auxiliary battery is also absent.

Otherwise, the comments made above with regard to the structure and function of the on-board network 4 also apply analogously to the on-board network 4 according to the third exemplary embodiment.

Figure 4:
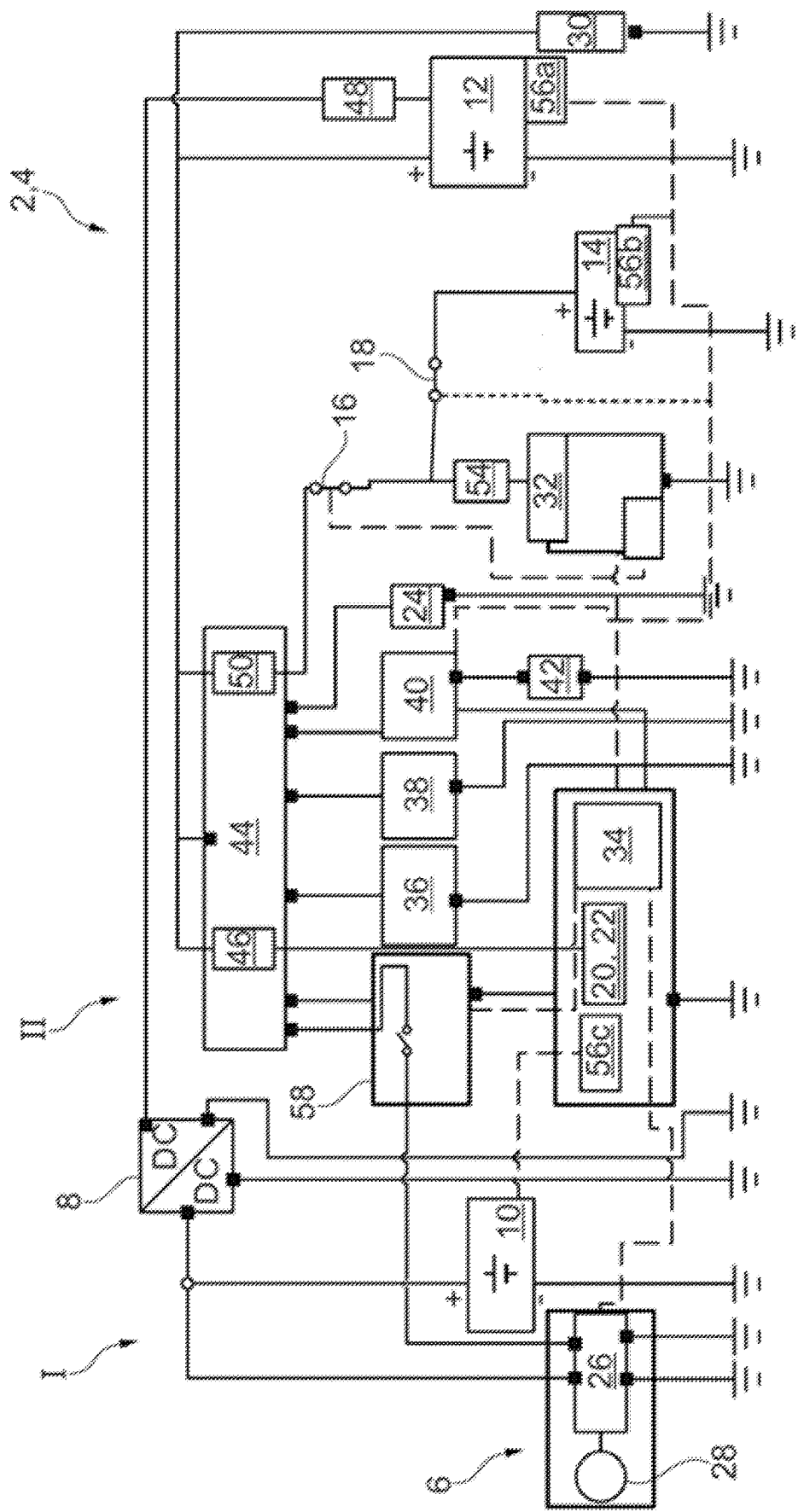
FIG. 4 shows a schematic representation of an on-board electrical network of a motor vehicle according to a fourth exemplary embodiment.

Reference will now additionally be made to FIG. 4 to explain a fourth exemplary embodiment.

The on-board network 4 according to the fourth exemplary embodiment differs from the on-board network 4 according to the third exemplary embodiment in that the transmission control unit 20 and/or the integrated hybrid controller 22 as well as the ABS/EPB system 32 have swapped their positions in the on-board network 4.

Otherwise, the comments made above with regard to the structure and function of the on-board network 4 also apply analogously to the on-board network 4 according to the fourth exemplary embodiment.

A method for operating the on-board electrical network 4 will now be explained.

In order to operate the on-board network 4 of the motor vehicle 2 with the first voltage circuit I and the second voltage circuit II, by means of the first switching element 16 in the closed state a component of the vehicle 2, such as the transmission control unit 20 and/or the integrated hybrid controller 22 or the ABS/EPB system 32 is supplied with electrical operating energy from the main battery 12, and the auxiliary voltage source 14 in the form of the auxiliary battery or in the form of the supercapacitor is charged.

If the auxiliary battery or the supercapacitor is fully charged or a fault is detected in this system, the on-board network control unit 40 generates a corresponding activation signal to open the second switching element 18. The switching element 16 remains closed.

Upon detection of a fault in the on-board network 4 itself (first step), the transmission control unit 20 and/or the integrated hybrid controller 22 or the ABS/EPB system 32 generates a corresponding activation signal to open the first switching element 16 (subsequent step). The switching element 18 remains closed.

In the respective fault cases, a constant voltage supply is thus always ensured for the transmission control unit 20 and/or the integrated hybrid controller 22 and/or the ABS/EPB system 32.

The operational safety of such an on-board network 4 is therefore increased.

What is claimed is:

1. An on-board electrical network of a motor vehicle comprising:
   a first voltage circuit;
   a second voltage circuit; and
   a DC-to-DC converter coupled between the first voltage circuit and the second voltage circuit;
   wherein the first voltage circuit has a first operating voltage which is higher than a second operating voltage in the second voltage circuit;
   wherein the first voltage circuit comprises a first battery at the first operating voltage;
   wherein the second voltage circuit comprises a main battery and an auxiliary voltage source both at the second operating voltage;
   wherein the second voltage circuit further comprises at least one of a transmission control unit and an integrated hybrid controller;
   wherein the second voltage circuit further comprises a first switching element connected between the main battery and the least one of a transmission control unit and an integrated hybrid controller and a second switching element connected between the auxiliary voltage source and the least one of a transmission control unit and an integrated hybrid controller;
   wherein each of the first and second switching elements is normally in a closed state to supply electrical energy from the main battery and the auxiliary voltage source to the at least one of a transmission control unit and an integrated hybrid controller, wherein the first switching element is switched to an open state in response to detection of a fault associated with the main battery, and wherein the second switching element is switched to an open state in response to detection of a fault associated with the auxiliary voltage source.

2. The on-board electrical network of claim 1, wherein the auxiliary voltage source is comprised of an auxiliary battery.

3. The on-board electrical network of claim 2, wherein the auxiliary battery is recharged from the DC-to-DC converter via the second switching element provided that the first switching element is in the closed state, and wherein the second switching element is switched to the open state in response to the auxiliary battery becoming fully charged.

4. The on-board electrical network of claim 1, wherein the auxiliary voltage source is comprised of an electrically conductive connection to the DC-to-DC converter.

5. The on-board electrical network of claim 1, wherein the auxiliary voltage source is comprised of a supercapacitor.

6. The on-board electrical network of claim 5, wherein the supercapacitor is recharged from the DC-to-DC converter via the second switching element provided that the first switching element is in the closed state, and wherein the second switching element is switched to the open state in response to the supercapacitor becoming fully charged.

7. The on-board electrical network of claim 1, wherein the first switching element is switched to the open state upon detection of 1) a starting mode of a starter motor in the second voltage circuit, 2) detection of a fault in the main battery, or 3) detection of a fault in the at least one of a transmission control unit and an integrated hybrid controller.

8. The on-board electrical network of claim 1, wherein the second switching element is switched to the closed state in order to start a charging process of the auxiliary voltage source, and wherein the second switching element is switched to the open state upon termination of the charging process.

9. A method of operating an on-board electrical network of a motor vehicle, wherein the network has a first voltage circuit, a second voltage circuit, and DC-to-DC converter coupled between the first voltage circuit and the second voltage circuit, wherein the first voltage circuit has a first operating voltage which is higher than a second operating voltage in the second voltage circuit, wherein the first voltage circuit comprises a first battery at the first operating voltage, wherein the second voltage circuit comprises a main battery and an auxiliary voltage source at the second operating voltage, and wherein the second voltage circuit further comprises at least one of a transmission control unit and an integrated hybrid controller, the method comprising the steps of:
   closing a first switching element in the second voltage circuit between the main battery and the at least one of a transmission control unit and an integrated hybrid controller while simultaneously closing a second switching element in the second voltage circuit between the auxiliary voltage source and the least one of a transmission control unit and an integrated hybrid controller to redundantly supply electrical energy to the at least one of a transmission control unit and an integrated hybrid controller;
   switching the first switching element to an open state in response to detection of a fault associated with the main battery; and
   switching the second switching element to an open state in response to detection of a fault associated with the auxiliary voltage source.

10. The method of claim 9, wherein the auxiliary voltage source is comprised of an auxiliary battery.

11. The method of claim 10, further comprising the steps of:
   recharging the auxiliary battery from the DC-to-DC converter by switching the second switching element to the closed state while the first switching element is in the closed state; and
   switching the second switching element to the open state in response to the auxiliary battery becoming fully charged.

12. The method of claim 9, wherein the auxiliary voltage source is comprised of an electrically conductive connection to the DC-to-DC converter.

13. The method of claim 9, wherein the auxiliary voltage source is comprised of a supercapacitor.

14. The method of claim 13, further comprising the steps of:
charging the supercapacitor from the DC-to-DC converter by switching the second switching element to the closed state while the first switching element is in the closed state; and
switching the second switching element to the open state in response to the supercapacitor becoming fully charged.

15. The method of claim 9, wherein the first switching element is switched to the open state upon detection of 1) a starting mode of a starter motor in the second voltage circuit, 2) detection of a fault in the main battery, or 3) detection of a fault in the at least one of a transmission control unit and an integrated hybrid controller.

16. The method of claim 9, wherein the second switching element is switched to the closed state in order to start a charging process of the auxiliary voltage source, and wherein the second switching element is switched to the open state upon termination of the charging process.

\* \* \* \* \*